Sept. 16, 1952  E. A. WILSON  2,611,064

ELECTRONIC VIBRATOR INSULATOR

Filed Nov. 9, 1949

INVENTOR.
ELMER A. WILSON.
BY
Lockwood, Goldsmith & Galt,
ATTORNEYS.

Patented Sept. 16, 1952

2,611,064

UNITED STATES PATENT OFFICE 2,611,064

ELECTRONIC VIBRATOR INSULATOR

Elmer A. Wilson, Beech Grove, Ind.

Application November 9, 1949, Serial No. 126,369

3 Claims. (Cl. 200—168)

This invention relates to a rubber can vibration insulator for electronic vibrators.

Electronic vibrators and similar devices are inherently subjected to self-generated head and mechanical vibration.

One chief object of the present invention is to incorporate in such a vibrator and like unit inherent vibration absorbing means whereby the vibrations will not be transmitted to the chassis and thus to other parts electrically and electronically associated with the said vibrator, which transmitted vibrations relative to the vibrator itself and/or such other parts may have a deleterious effect and/or shorten the normal life and usage thereof.

Heretofore it has been proposed to utilize sponge rubber for such purpose and it has been so used. However, a vibrator may create a large amount of heat, which heat, it has been found, reacts with the softener used (usually of an oil type) so that the sponge rubber cushion fails rapidly in service.

A sponge rubber cushion for a vibrator and now in commercial use, when subjected to a temperature of 400° F., failed in thirty (30) minutes. that is slumped and collapsed so that it lost its shape. The insulator of the present invention when tested at the same temperature failed to show any tendency to collapse even at the end of six (6) hours.

Accordingly, a second object of the invention is to provide a cushion of a form of rubber that does not fail when subjected to prolonged and/or excessive temperature abuse.

One of the features of the invention resides in the use of a soft rubber or rubber-like material that is not of sponge character.

Another feature of the invention is to provide a structure that is of heat dissipating character having regard to the form, shape and outline thereof.

Other objects and features of the invention will be set forth more fully hereinafter.

The full nature of the invention will be understood from the accompanying drawings and the following description and claims:

Figure 1:
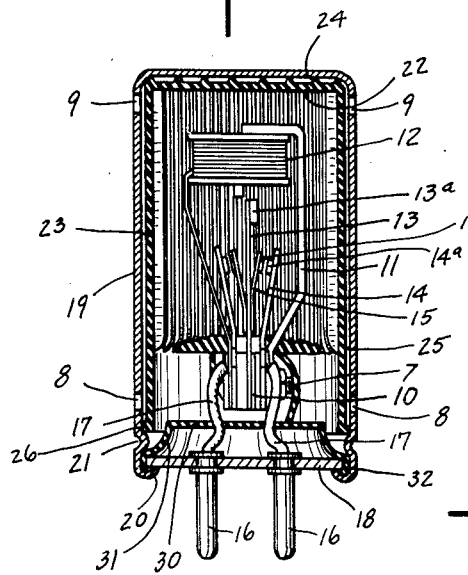
Fig. 1 is a central sectional view through a vibrator in which is embodied the present invention.

In Fig. 1 of the drawings, 10 indicates a conventional junction block from which rises standard 11 supporting a magnet coil or relay 12 and also supporting reed 13 with armature or keeper 13a disposed contiguous to said magnet and magnetically responsive thereto. 14 and 15 indicate switch blades or leaves carried by said block and these terminate in contacts 14a and 15a. All the aforesaid is conventional. A vibrator unit of this type is so well known it requires no additional description to disclose the wiring circuit and the operation of such unit except to say that herein 16 indicates the four connector prongs of such unit and 17 indicates wire connections between said prongs and the various circuit elements of the unit.

Since the aforesaid is provided with four connecting terminal prongs, although a greater or lesser number may be provided, whether used or not, the present invention accordingly will be described as associated with four prongs, the latter being insulatably mounted upon a Bakelite base member 18.

A metal can 19 has its open end defined by an inturned portion 20 and an adjacent indented portion 21. When this can is applied over the unit the member 18 is trapped between portions 20 and 21 and the unit is fully protected mechanically, and all parts, except projecting prong 16, are enclosed. In general, all the aforesaid may be said to be conventional to the present state of the vibrator art.

Disposed within the metal can 19 and in intimate contact therewith as hereinafter pointed out is a soft rubber can, see Fig. 1, having the top 22 and cylindrical side wall 23. The top 22 has annular ridges 24 disposed exteriorly thereof and contacting the top of the metal can.

Figure 2:
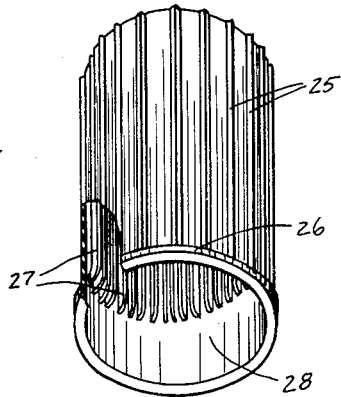
Fig. 2 is a perspective view of the cushion can portion of the invention, a portion thereof being broken away to show a portion of the side wall interior in greater detail.

The outside of the rubber can side wall 23, see Figs. 1 and 2, is provided with a plurality of substantially longitudinally coextensive ribs 25 that project radially outward as shown. The mouth of this can is defined by the rib connecting outwardly directed peripheral flange portion 26. The inside of the rubber can side wall 23 is provided with more closely spaced parallel ribs 27 which extend to the top 22 as shown but which at the bottom terminate in spaced relation to the mouth of said can providing a smooth bore portion 28.

The thickness of the can and softness of the cured rubber utilized will permit the can to be readily turned inside out and vice versa if desired or required in fabrication or certain uses. The drawings, while not to scale, do, however, illustrate comparative thickness so that it will be apparent that regardless of any other advantage, etc., the present invention requires much less rubber material to attain comparable and better results than heretofore attained with sponge rubber.

The aforesaid sock thus provides interior heat pick up ribs which transfer their collected heat to the body wall from which it is transferred to the metal can for final dissipation. To increase heat transfer from the device the metal can is apertured near the top at 9 and near the indented portion 21 as at 8. This provides for circular ventilation aiding materially in heat dissipation and reducing interior temperature rise.

Note the solid rubber has a better coefficient for heat transference than sponge rubber, thus further insuring more rapid dissipation of heat. The inside ribs have the further function of absorbing sound waves produced incident to vibrator use. Since the space between the two cans is sealed off by the top rings 24 and bottom flange 26, the internal sound waves therein cannot circulate between the two walls but escape at the holes in the metal can.

Figure 3:
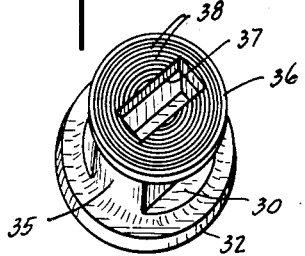
Fig. 3 is a perspective view of the cushion base looking down upon the top thereof.
Figure 4:
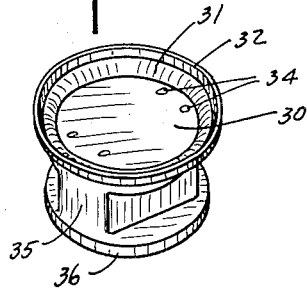
Fig. 4 is a similar view of the same part looking at the bottom thereof.

Reference will now be had to Figs. 1, 3 and 4 wherein the soft rubber base insulator or plug closure is illustrated. Herein 30 indicates a wall member provided with an outwardly and downwardly directed flared shell portion 31 terminating in a downwardly directed skirt or rim 32.

The base includes therethrough circuit wire passing holes 34 disposed in predetermined spaced relation, as shown, see Fig. 4. Extending upwardly from said base 30 and integral therewith is a housing portion 35 that is hollow and is closed by an integral circular cap 36. The latter includes opening 37, rectangular in outline, see Fig. 3, providing access to the chamber in housing 35 or the interior of said housing.

The cap of said housing projects beyond the same as shown. It also has its upper surface annularly ribbed as indicated at 38, the concentric ribbing herein being spaced closer than those on the rubber can or sock top.

The mount or base 10 is received in the plug closure chamber and trapping retained by the cap edges at opening 37. The wall of said housing can yield for any deforming element, such as terminal stud 7, see Fig. 1, whenever necessary.

The skirt 32 cushions base member 18 in the metal can. As indicated previously, circuit wires 17 from prongs 16 carried by member 18 pass through openings 34 into the housing for connection to the active elements of the vibrator carried by the mount or block 10 aforesaid. If desired the cap might be enlarged so that its peripheral edge could have frictional fit with smooth bore 28. It, however, is not so shown.

As before, this closure by virtue of annular ribs 38 absorbs sound waves. Being of soft solid rubber it better conducts heat than a sponge rubber base.

Figure 5:
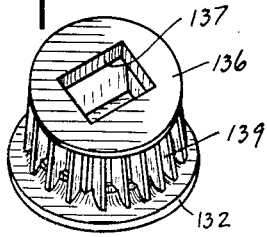
Fig. 5 is a view similar to Fig. 3 and of a modified form of base.

Reference will now be had to Fig. 5 wherein a modified form of closure is illustrated. Herein numerals increased by 100 indicate parts identical or similar to primary numeral designated parts in Figs. 1, 3 and 4. The major difference is the elimination of the annular ribs 38. Herein, however, the housing instead of being substantially rectangular in outer outline is circular and is exteriorly provided with vertical ribs 139.

Figure 6:
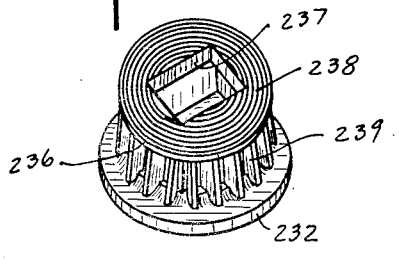
Fig. 6 is a view similar to Fig. 3 and of another modified form of base.

Reference will now be had to Fig. 6 wherein 200 series numerals are similarly utilized. In this form the closure is more closely similar to that shown in Fig. 5 but it herein includes annular ribs 238.

By way of example only the solid resilient material used was a synthetic rubber known as butyl or GRI (Government Rubber—Isobutylene). The best molding properties of this material were obtained by curing the compound for about twenty minutes at 300° F. However, some of this material to all appearances and tests served equally as well when cured at a temperature of about 400° F. and for a shorter time, to wit, about nine minutes. Certain grades of polystyrene have flexible characteristics and are solid and are capable of withstanding a reasonable amount of heat and can be used as a satisfactory material when desired or required. Other types of synthetic rubber than that specified immediately preceding may also be used. The polystyrene mentioned is a rubber-like plastic which, as stated, meets the vibrator requirement. The preferred material, however, even though some forms of natural rubber compounded material may well serve requirements, is that specified initially herein.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. An enclosing casing for a vibratory interrupter which includes a stack, a supporting frame carried by said stack and having a driving magnet at its free end and a vibratory reed supported by said stack and oppositely disposed contact arms supported by said stack, said casing comprising a metallic cylindrical open bottomed shell and a solid, relatively thin walled rubber liner sock for said shell having longitudinally disposed spaced apart ribs on the outer surface of said liner contacting the inner surface of said shell, a resilient support for said vibrator and an insulating closure cap supporting said support and adapted to close the bottomed open end of said shell.

2. An enclosing casing for a vibratory interrupter which interrupter comprises a stack, a supporting frame extending upwardly from said stack, a driving magnet supported on the free end of said frame, a vibratory reed supported in said stack and oppositely disposed contact arms supported in said stack, said enclosing casing comprising a metal open bottomed cylindrical shell, a solid, relatively thin walled rubber lining for said shell having longitudinally disposed spaced apart ribs on the outer surface thereof contacting said shell and longitudinally extending spaced apart ribs on the inner surface thereof, a rubber supporting member for said stack having a socket formed therein for the reception of said stack and an insulating closure cap for the open end of said metallic shell supporting said vibrator support and closing the lower end of said shell, said insulating closing member carrying the contact prongs for the vibrator.

3. An enclosing casing for a vibratory switch which switch includes a stack, a frame extending upwardly from said stack and a driving magnet mounted at the free end of said frame, a vibrating reed supported in said stack and oppositely disposed contact arms carried by said stack, said enclosing casing comprising a metallic cylindrical shell open at its bottom, a solid, relatively thin walled rubber liner for said shell having longitudinally disposed spaced apart ribs on its outer surface contacting the inner surface of said shell, longitudinal spaced apart inner ribs on the inner surface of said liner stopping short of the bottom end of the liner and ribs on the top of said liner adapted to engage the inner surface of the enclosing shell, a rubber supporting base for said vibrator having a stack receiving socket therein and embraced by the lower end of said rubber liner, an insulating closure member for the open end of said container supporting said rubber supporting member and closing the open end of said container and contact prongs mounted on said insulating supporting member.

ELMER A. WILSON.

REFERENCES CITED

The following references are of record in the file of this patent:

UNITED STATES PATENTS

| Number | Name | Date |
|---|---|---|
| 2,068,522 | Thordarson | Jan. 19, 1937 |
| 2,140,792 | Dressel et al. | Dec. 20, 1938 |
| 2,190,685 | Slater | Feb. 20, 1940 |
| 2,294,125 | Neidermeier | Aug. 25, 1942 |
| 2,478,101 | Huetten | Aug. 2, 1949 |